United States Patent [19]

Nannini et al.

[11] Patent Number: 5,871,079
[45] Date of Patent: Feb. 16, 1999

[54] EQUIPMENT AND A METHOD FOR THE FORMATION OF GROUPS OF PRODUCTS TO BE FED ORDERLY AT PREDETERMINED INTERVALS

[75] Inventors: Luciano Nannini; Giulio Strazzari, both of Bologna, Italy

[73] Assignee: Azionaria Construzioni Macchine Automatiche A.C.M.A.S.P.A., Bologna, Italy

[21] Appl. No.: 743,913

[22] Filed: Nov. 5, 1996

[30] Foreign Application Priority Data

Nov. 7, 1995 [IT] Italy .................................. B095A0521

[51] Int. Cl.⁶ .................................................. B65G 47/24
[52] U.S. Cl. ...................................... 198/377.04; 198/377
[58] Field of Search ................................ 198/374, 377.04

[56] References Cited

U.S. PATENT DOCUMENTS

| | | | |
|---|---|---|---|
| 3,215,250 | 11/1965 | Schubert | 198/377.04 |
| 3,747,737 | 7/1973 | Brooke | 198/374 |
| 3,837,474 | 9/1974 | Brooke | 198/374 |
| 3,952,865 | 4/1976 | Rudszinat et al. | 198/377.04 |
| 4,394,898 | 7/1983 | Campbell | 198/377.04 |
| 4,396,109 | 8/1983 | Nambu . | |
| 5,022,511 | 6/1991 | Gorrieri et al. . | |
| 5,261,520 | 11/1993 | Duke . | |

FOREIGN PATENT DOCUMENTS

| | | |
|---|---|---|
| 647 561 | 4/1995 | European Pat. Off. . |
| 37 09 046 | 10/1988 | Germany . |
| 2 063 200 | 6/1981 | United Kingdom . |

*Primary Examiner*—Karen M. Young
*Assistant Examiner*—Gregory A. Morse
*Attorney, Agent, or Firm*—Pillsbury Madison & Sutro LLP

[57] ABSTRACT

For the formation of groups of products to be fed orderly at predetermined intervals to a processing machine an equipment includes a first conveyor, a second conveyor positioned on the inlet of the processing machine and having pockets for housing the products arranged at predetermined intervals, a transfer device having clamping units which are mobile in phase relation with the conveyors for removing the products from the first conveyor and transferring them into respective pockets of the second conveyor and positioning them in groups, under the action of controls arranged to control the differentiated release of at least two products into each pocket of the second conveyor, these two products being in shifted positions one with respect to the other, enabling these products to be reached in sequence respectively by a corresponding clamping unit of an even position and by a clamping unit of an uneven position, until a respective group of products is completed.

10 Claims, 4 Drawing Sheets

EQUIPMENT AND A METHOD FOR THE FORMATION OF GROUPS OF PRODUCTS TO BE FED ORDERLY AT PREDETERMINED INTERVALS

BACKGROUND OF THE INVENTION

The present invention relates to an equipment for the formation of groups of products to be fed orderly at predetermined intervals.

In particular, the present invention relates to an equipment for the formation of groups of products, for example bar of soap or the like, to be fed orderly at predetermined intervals to a processing machine, for example a wrapping machine, to which the following description will make explicit reference without falling outside the general scope of the present invention.

In the field of soap packaging, it is known practice to feed a wrapping machine with soap bars transferred at constant intervals, even though said soap bars are irregularly produced by a dispensing machine and therefore come out from the machine at variable intervals.

The equipment used at present for feeding the soap bars at predetermined intervals substantially include: a first conveyor positioned on the outlet of the dispensing machine, which receives the products at intervals of varying length and then arranges them at intervals of a constant length along a first path; a second conveyor aligned with the first conveyor and placed at the inlet of the processing machine along a second path; and a product transfer device, for the transferring of products from the first to the second conveyor, which is controlled, during the operative phase, by appropriate control means.

The second conveyor is equipped with a plurality of pockets or slots for housing the products, the pockets or slots being distributed at predetermined intervals, along the second path and being mobile, at a constant speed, along a feeding direction of the processing machine.

The transfer device comprises a plurality of clamping units arranged uniformly at predetermined intervals along a looping third path, at least a section of which is positioned above both the first and the second conveyors.

The clamping units are mobile along the third path at a constant speed and support respective product clamping heads, equipped with suckers (i.e. vacuum-powered grippers), which are mobile, in turn, with respect to the clamping units themselves, in such a way as to approach or move away in height with respect to the conveyors. When in use, the equipment permits the removing and transferring in sequence of the products from the first conveyor, thus releasing them orderly (i.e. in an orderly manner), one into each respective pocket of the second conveyor.

The drawback of those types of equipment is that they are operatively rigid and limited, since they are not capable of transferring the soap bars from the first conveyor to the second conveyor in such a way as to position them in orderly groups into the same pocket of the second conveyor.

SUMMARY OF THE INVENTION

The object of the present invention is to provide an equipment for the formation of groups of products, in particular soap bars, to be fed orderly at predetermined intervals to a wrapping machine, which permits one not only to resolve the above-mentioned problem, but also from groups of soap bars from a stream of soap bars of various dimensions which are grouped in different ways and with different orientations.

The stated object is realized in a method for the formation of groups of products to be fed orderly at predetermined intervals to a processing machine comprising a first conveyor feeding the products along a first path at a constant interval, a second conveyor, positioned on the inlet of the processing machine, having a plurality of pockets for the housing of the products, arranged at predetermined intervals along a second path, and which is mobile at a constant speed along a feeding direction of the processing machine, a transfer device having a plurality of clamping units arranged uniformly along a third path, at least a section of which is positioned above both the first and second conveyors, the clamping units being mobile along the third path at a constant speed and supporting the product clamping heads which are mobile, in turn, with respect to the clamping units themselves; there being provided control means for controlling the transfer device during the operative phase with the conveyors for removing the products from the first conveyor and for transferring them in sequence to a pocket of the second conveyor; the equipment being characterised in that the product clamping units are in even numbers and are connected to the control means in such a way as to be identified by the control means as the product clamping units with numbers which are odd or even, the control means controlling the differentiated release of at least two products in the same pocket of the second conveyor, the clamping units being shifted one with respect to the other and being reached in sequence by a corresponding product clamping unit of an even position and by a product clamping unit of an uneven position, until the completion of the group of products.

Furthermore, the present invention relates to a method for the formation of groups of products to be fed orderly at predetermined intervals to a processing machine.

According to the present invention, a method is supplied for the formation of groups of products to be fed orderly at predetermined intervals to a processing machine, the method comprising the phases of constant interval product feeding, on a first conveyor positioned on the outlet of a dispensing machine, of transferring in a controlled way the products sent in sequence from the first conveyor to a second conveyor positioned on the inlet of the processing machine, and equipped with a plurality of pockets for the housing of the products, which pockets are arranged at predetermined intervals along a second path and an mobile, at a constant speed, along a feeding direction of the processing machine, the transferring phase being carried out by means of a transfer device having a plurality of clamping units which are arranged uniformly along a third path, at least a section of which is positioned above both the first and the second conveyor, the clamping units being mobile along the third path at a constant speed and supporting the product clamping heads mobile, in turn, with respect to the clamping units themselves; the method being characterized in that the transfer phase is carried out by means of the product clamping units which are of an even number and are controlled by control means in such a way as to be identified as clamping units of an even position and clamping units of an uneven position, for controlling the differentiated release of at least two products into the same pocket of the second conveyor, in shifted positions one with respect to the other, which positions are reached in sequence by a corresponding clamping unit of an even position and by a clamping unit of an uneven position, until the completion of the group of products.

BRIEF DESCRIPTION OF THE DRAWINGS

The invention will now be described in detail, by way of example, with the aid of the accompanying drawings, in which.

DETAILED DESCRIPTION OF THE PREFERRED EMBODIMENTS

Figure 1:
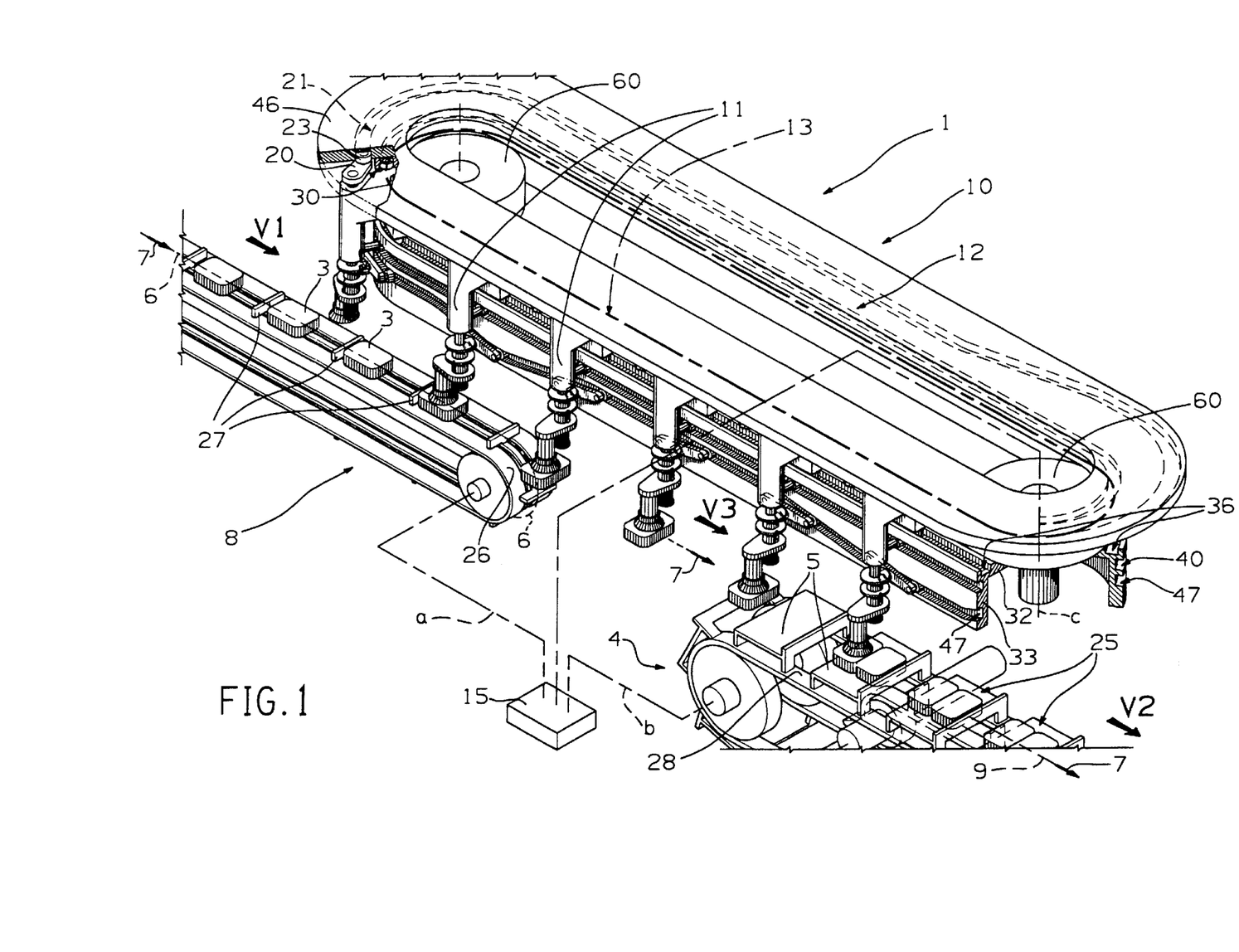
FIG. 1 is, as a whole a perspective view, with certain parts omitted so as to better evidence others, of a preferred embodiment of the equipment according to the present invention.

With reference to FIG. 1, the numeral 1 denotes an equipment for the formation of groups 25 of ordered products 3 irregularly received from a printing machine, which products are to be fed, at predetermined intervals, to a processing machine, both machines are not shown since they do not pertain to the present invention.

The equipment 1 basically comprises a first and a second conveyor 8, 4, respectively positioned on the outlet of the printing machine and on the inlet of the processing machine, positioned in sequence along a common feeding direction 7, and a product 3 transfer device 10 which, operating in a relevant phase and being controlled by the respective control means 15, permits removal of the products 3 from the first conveyor 8 and transferal of them in sequence to the second conveyor 4.

The first conveyor 8 is of a continuous type with a belt 26 looped around, and shows ordered pushing elements 27 regularly arranged at predetermined intervals and mobile at a constant speed V1 along a first path 6. The products 3, which the first conveyor 8 receives in an irregular way, are individually engaged by the pushing elements 27 at predetermined intervals, and during their transferring towards the outlet of the first conveyor 8, and in a known way, they move at regular intervals and at a very constant speed. The second conveyor 4, also of a continuous type with a belt 28 looped around, is equipped with a plurality of pockets 5, or with equivalent slots, for the housing of the products 3, which pockets are arranged at predetermined intervals along a second continuous path 9, and are mobile at a constant speed V2 towards the processing machine. The transfer device 10 basically comprises (particular reference being made to FIG. 2) a conveyor belt 29, which is looped around two rollers 60 and along a box-type element 30. The conveyor belt 29 is positioned at a higher level with respect to the conveyors 4 and 8, and it is activated in such a way as to have a constant speed V3 which is greater than the speed V1 of the first conveyor 8.

Figure 2:
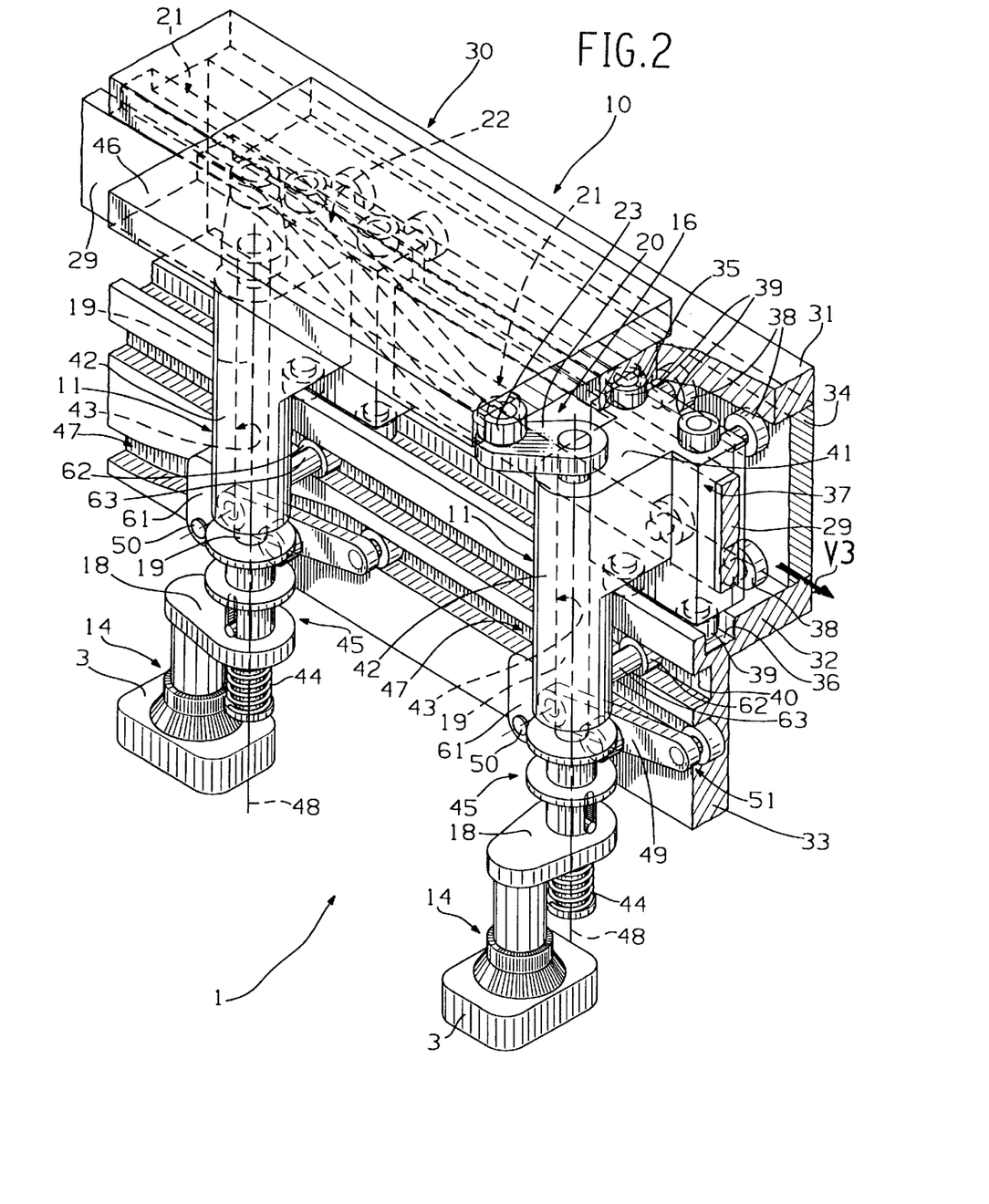
FIG. 2 is a perspective view showing, on an enlarged scale and with some parts omitted so as to better evidence others, a detail of FIG. 1.

The box-type element 30 is delimited by an upper plate 31 and a lower plate 32, which are horizontally positioned and have a shape, in a plan view, which is substantially rectangular, but with rounded corners. The upper plate 31 is equipped, along the periphery of its upper surface, with an annular plate 46 which protrudes from the outline of the upper plate 31, and the annular plate 46 shows a frontal guide 21, if necessary equipped with an inclined section 22 in the horizontal plane in which lies the plate 46 itself, and opposed to the surface of the belts 26 and 28 of the conveyors 4 and 8.

The lower plate 32 (particular reference being made to FIG. 2) is equipped, along its external periphery, with a first vertical wall 33, with an annular development, turned towards the bottom, and it is connected to the upper plate 31 by a second vertical wall 34. The first vertical wall 33 has a groove 40 and an underlying guide 47 inclined in the vertical plane in which the first vertical wall 34 lies.

Both the lower plate 32, and the upper plate 31, have respective opposed grooves 36 and 35, in which pairs of rollers 39 engage themselves slidingly guiding the transfer belt 29 itself along a third path 12 looped around, substantially horizontal, a section 13 of which is positioned above the first and second conveyors 8 and 4.

A plurality of carriages 37 is mounted on the conveyor belt 29, each carriage bearing a product clamping unit 11. The carriages 37 are arranged uniformly at predetermined intervals along the third path 12 and are provided with two pairs of sliding rollers 38 on the box-type element 30, which rollers respectively strike the surfaces faced by the upper plate 31 and by the lower plate 32. Each carriage 37 supports a product 3 clamping unit 11, supporting it rigidly, projectingly and laterally to the transfer belt 29, with which the clamping units 11 advance at the speed V2 moving in phase with the pushing elements 27.

Each clamping unit 11 has a hollow body, which is substantially "L" shaped, having an arm 41 which projects horizontally from the carriage 37 and a hollow vertical arm 42, axially crossed by a through hole 43.

A shaft 19 crosses the hole 43 coaxially and it is supported by the vertical arm 42 revolvingly about a vertical axes 48. Above, the shaft 19 projects from the hole 43 connecting itself with a crank 20 which extends transversally to the shaft 19 itself.

The crank 20 is equipped, at one of its activating ends, with a sliding block 23, fitted with a revolving roll, which slidingly engages into the frontal guide 21 of the annular plate 46 in order to control the angular position of the shaft 19 about the respective axis 48.

Below, the shaft 19 projects from the hole 43 coupling with a sleeve 45 in a fixed angular way and axially sliding towards the bottom against the reaction of a spring 44. The sleeve 45 bears on its lower end an arm 18, which is projectingly brought, transversally, to the shaft 19 under the vertical guide 47 and is fitted with a sucker clamping head 14. The spring 44 reacts against the arm 18. The clamping head 14 extends parallely to the axis 48 and towards the bottom from the free end of the arm 18. Laterally, the sleeve 45 is engaged with a level 49, in an intermediate position between the fulcrum and the maneuver end 51 of the lever 49 itself. The fulcrum 50 is positioned at the end of a bracket 61 constrained to the vertical arm 42 (see FIG. 7), while the maneuver end 51 engages slidingly with the guide 47 that is inclined in the vertical plane.

The vertical arm 42 is also equipped with a pivot 63 positioned transversally towards the vertical wall 33, and the pivot 63 itself couples to the groove 40 by means of a roller 62.

Due to the dragging motion provided by the belt 29 and as a consequence of the interaction of the product clamping unit 11 with the frontal guide 21 and with the guide 47, the clamping heads 14 are revolving about the vertical axis 48 and are vertically mobile with respect to the clamping unit 11 moving away and approaching with respect to the belts 26 and 28 of the conveyors 8 and 4.

More in particular, the frontal guide 21, the sliding block 23, the crank 20, the shaft 19 and the arm 18 described above are to be considered a preferred embodiment of first rotation means 16 of the clamping head 14 about the vertical axes 48; these are shaped in such a way as to determine, during the transferring of the products 3, their shifting from an initial adjusting position, during their transfer onto the first conveyor 8, to a final adjusting position, which is angularly rotated and corresponding to the release position of the products 3 into the pockets 5 of the second conveyor 4.

Figures 7, 8:
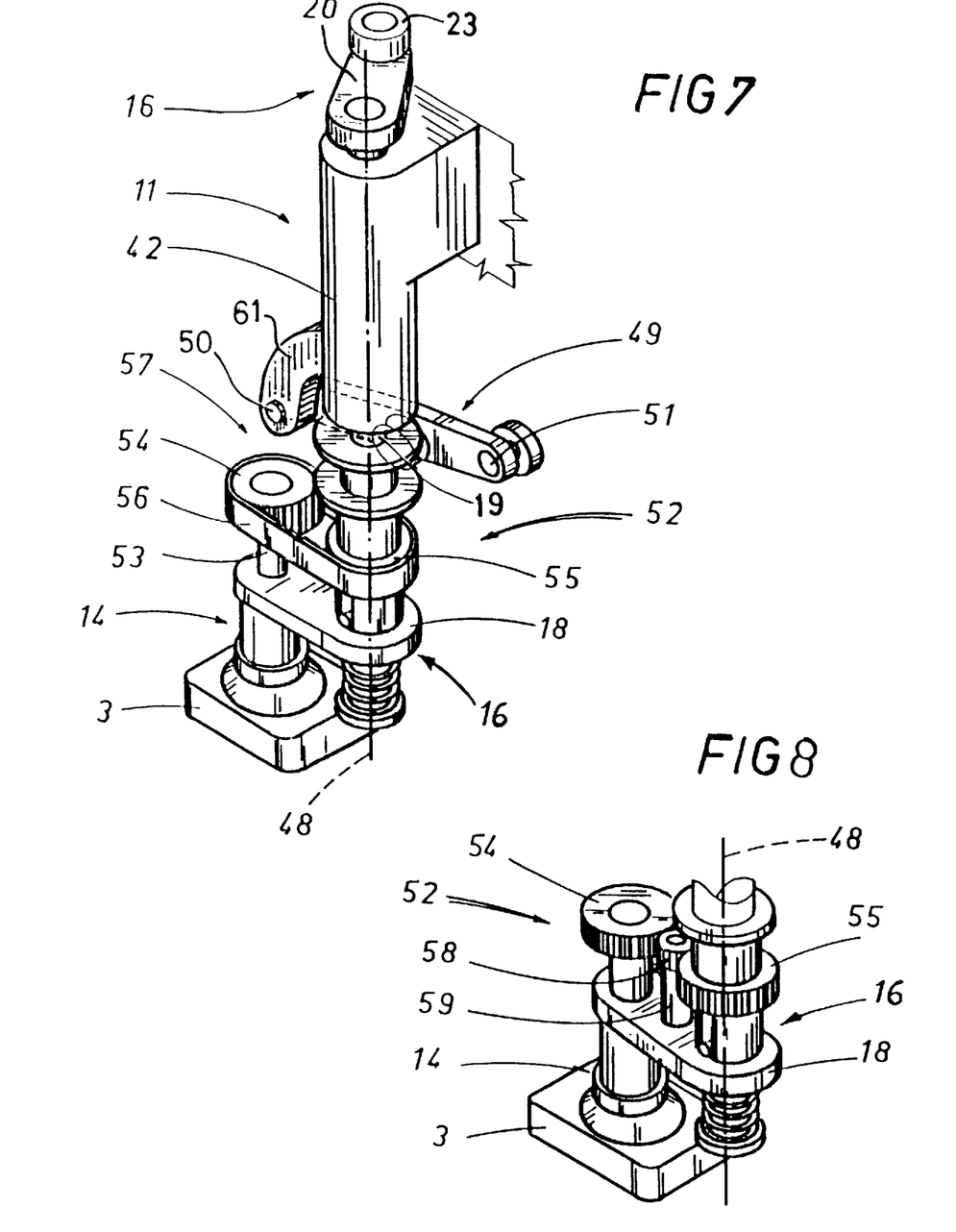
FIGS. 7 and 8 show perspective views, on an enlarged scale, of special embodiments of some of the details of FIG. 2.

In the particular embodiment shown in FIGS. 7 and 8, the clamping units 11 also comprise second rotation means 52 of the clamping heads 14, shaped in such a way as to transmit to the clamping heads 14 themselves as a relative rotation with respect to the arm 18, which adds to that received by the first rotation means 16.

More in particular, with reference to FIG. 7, it can be seen that the clamping heads 14 are supported by a shaft 53, which is mounted rotatingly on the arm 18 and connected by a mechanical transmission 57 to the vertical arm 42 of the clamping unit 11. The mechanical transmission 57 comprises a first wheel 54 defining a toothed wheel, splined at an upper end of the shaft 53, a second wheel 55 also defining a toothed wheel, fixed to the vertical arm 42 of the clamping unit 11 in such a way as to be constrained to it with respect to the rotation about the vertical axes 48, and a toothed flexible element 56 looped around the pulleys 53 and 54.

When the first rotation means 16 transmit to the arm 18 a rotation about the vertical axis 48, the mechanical transmission 57 transmits at the same time a relative rotation, in the opposite direction, to the clamping head 14 with respect to the arm 18, which permits varying at the same time the direction of the products 3 with respect to the rotation transmitted to the arm 18 by the first rotation means 16.

In the embodiment shown in FIG. 8, the mechanical transmission 57 comprises an idle wheel 58 which is interposed between the first and the second wheels 54 and 55, both defined in this case by two toothed wheels, and which is supported, by conventional coupling means not represented, by a pivot 59 fixed to the arm 18.

The idle wheel 58 can move, by activation of the coupling means, between an operating position (shown in FIG. 8) and a non-operating position (not shown) wherein the idle wheel 58 itself is no longer engaged to the wheels 54 and 55.

In this way, depending on the operating conditions of the coupling means, when the arm 18 is placed in rotation about the vertical axis 48, in the position in which the idle wheel 58 is engaged with the wheels 54 and 55, a counter-rotation of the clamping heads 14 is obtained with respect to the arm 18. Instead, in the disengaged position of the idle wheel 58 with respect to the wheels 54 and 55, the immobility of the clamping heads 14 with respect to the arm 18 is obtained. For reasons that will better emerge from the description that follows, the equipment 1 envisages an even number of products 3 clamping units 11 connected with the control means 15 (schematically shown with a block), so that it is possible to identify the clamping units 11 themselves as clamping units 11 of an even position and as clamping units 11 of an uneven position, number in sequence, if necessary, in relation to the total number of products 3 which have to be grouped in the same pocket 5 of the second conveyor 4.

That characteristic permits the control means 15 to control the clamping units 11 in pre-established positions, in relation to their position and to their identification number, in such a way as to obtain the differentiated release of at least two products 3 into the same pocket 5 of the second conveyor 4.

The products 3 are released in shifted positions one with respect to the other, which are reached in sequence by a corresponding clamping unit 11 of an even position and by a clamping unit 11 of an uneven position, until the completion of the group 25 of products 3 of the pocket 5.

More in particular, the product 3 release positions are determined by the control means 15 depending on the speeds V2 and V3, respectively of the second conveyor 4 and the transfer device 10, as well as on the characteristics of the shape, orientation and dimensions of the products 3 destined to form the group 25 of products 3 to introduce into the same pocket 5.

The detailed description of the interfacing of the control means 15 with the clamping units 11, for the identification and recognition which is essential for controlling the equipment 1, is omitted from the description that follows since a possible embodiment of the control, shown as a non-limiting example, is disclosed in the U.S. Pat. No. 5,022,511.

When in use, the equipment 1 is capable of performing different types of formation of the groups 25 of products 3. Some of these are shown as non-limiting examples, in FIGS. 3 to 6, and can all be obtained by means of a simple and easy reconfiguration of the equipment 1 with particular reference made to the first rotation means 16 and the second rotation means 52 of the clamping heads 14.

Figure 3:
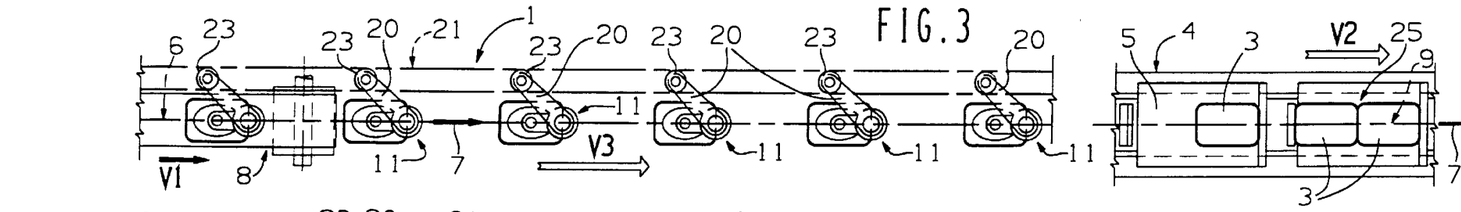
FIG. 3 shows a schematic plan view of the equipment for the formation of groups of products positioned in sequence along the feeding direction of the processing machine.

From FIG. 3 it can be seen in fact that starting from a configuration of the equipment 1 wherein the horizontal guide 21 does not have the inclined section 22 and wherein each clamping unit 11 envisages the parallel positioning of its own arms 18 and its own cranks 20 which are inclined by an alpha angle, and wherein, finally, all of the clamping units 11 are identically orientated with respect to the horizontal guide 21, it is possible to position the products 3, in a row, in a reciprocal queuing in the same pocket 5 of the second conveyor 4, without varying their orientation with respect to that initially taken up on the first conveyor 8.

In fact, if a numeration of the type "0,1,2,3 . . . " is given to the clamping units 11, distinctly controlling the release of the various clamping units 11 through the control means 15, the product 3 transferred, for example, from the clamping unit 11 with position "1" will be released into a shifted position along the feeding direction 7 with respect to the release position of the previous clamping unit 11 with position "0".

Obviously, the relative shifting of the release positions can be correlated as desired with the effective dimensions of the products 3 which follow each other in the pocket 5, in order to obtain, for example, the releasing of the products 3 in a position which closely resembles the reciprocal contact.

Figure 4:
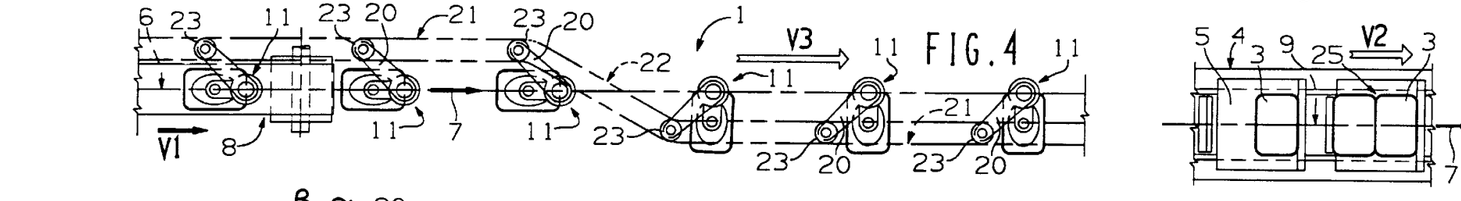
FIGS. 4, 5 and 6 show schematic plan views of the equipment for the formation of groups of products with different orientations in a final feeding position which is different with respect to their initial receiving position.

In the case shown in FIG. 4, the guide 21 is equipped with the inclined section 22 and the crank 20 and the arms 18 are staggered by an alpha angle. Furthermore, starting from the fact that all of the clamping units 11 are equally orientated with respect to the guide 21 and by transmitting a rotation by 90° to all of the clamping units 11, it is possible to obtain, by means of the differentiated release between the clamping unit 11 of even and uneven positions, a group 25 of products 3 positioned in the same pocket 5 in sequence (one after the other) along the feeding direction 7, but rotated with respect to their initial orientation. In the case shown in FIG. 4, the products 3 are rotated with respect to their initial orientation by 90°.

Figure 5:
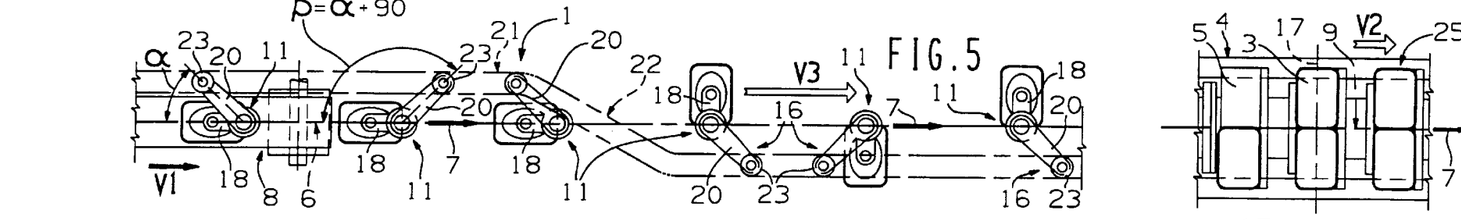

FIG. 5 shows a configuration wherein the products 3 are also orientated on the first conveyor 8, they move along the first path 6, and the crank 20 and the arms 18 of the single clamping units 11 are angularly staggered between each other. In particular, in the advancement sequence of the clamping units 11, the cranks 20 and the arms 18 are alternatively staggered between each other by a general alpha angle and respectively by a beta angle equal to alpha+90°, using as reference the direction of the advancement path 6 or the feeding direction 7. In other words, the cranks 20 and the corresponding arms 18 of the clamping units 11 having even or uneven positions, depending on how they have been named by the control means 15, are staggered between each other by a general alpha angle which is different from the beta angle formed by the cranks 20 with respect to the corresponding arms 18 of the clamping units 11 adjacent to the first ones which are inversely named with even or uneven numbers.

In this case, the equivalent rotation transmitted by the first rotation means 16 permits positioning the products 3 in reciprocal approaching conditions according to a transversal pairing, shown with a broken line 17, with respect to the feeding direction 7, along the conveyor 4.

Figure 6:
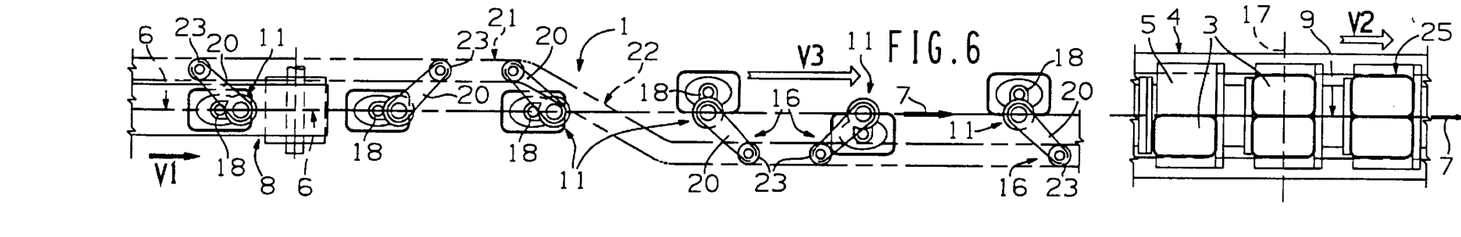

In FIG. 6, the positioning of the cranks 20 with respect to the arms 18 of the clamping units 11 is equal to that described with reference to FIG. 5. In this case, the clamping units 11 also comprise the second rotation means 52 (as described and illustrated in the embodiment of FIGS. 7 and 8), thanks to which, in addition to the rotation transmitted to the first rotation means 16, a contemporary counter-rotation of the clamping heads 14 is added which permits to position the products 3 into the pockets 5 in reciprocal approach positions according to a transversal pairing 17 with respect to the feeding direction 7.

Unlike the previous case, the orientation position obtained is parallel to that taken up initially by the products 3 during their transfer onto the first conveyor 8.

In the case in which the second rotation means 52 are activated according to the example shown in FIG. 8, it is obviously possible to alternatively obtain the formation of the groups 25 shown in FIGS. 6 and 7, simply by activating or disactivating the above-mentioned coupling means. Obviously, the functioning cycle of the equipment is continuous and, as already mentioned, in all the cases of functioning of the equipment 1 considered above, the release positions of the products 3 are determined by the control means 15 depending on the speed V2 and V3, respectively of the second conveyor 4 and of the transfer device 10, as well as on characteristics of shape, orientation and dimensions of the products 3 destined to form the group 25 of the products 3 to introduce into the same pocket 5.

What is claimed is:

1. An equipment for forming groups of products to be fed to a processing machine, comprising:
   a first conveyor arranged for feeding the products in succession along a first path, with an interval of first constant length between succeeding ones of the products;
   a second conveyor arranged for feeding an inlet of the processing machine; said second conveyor having a plurality of pockets arranged in succession along a second path, with an interval of a second constant length between succeeding ones of the pockets; the second conveyor being arranged to be operated at a constant speed towards the inlet of the processing machine;
   a transfer device having a plurality of clamping units which are uniformly arranged for movement along a third path; at least a section of said third path being disposed above a section of the first conveyor and a section of the second conveyor at which transfer of products from the first conveyor to the second conveyor is to occur; said clamping units being arranged to be moved along said third path at a constant speed;
   said clamping units including movable supports supporting respective clamping heads for movement of the clamping heads relative to the respective clamping units throughout respective fourth paths;
   control means operatively associated with the transfer device for controlling the transfer device to operate in phased relation with said first and second conveyors, for removing the products in succession form said first conveyor and depositing them in succession in respective pockets of the second conveyor, a constant number of at least two of the products per pocket;
   said clamping units being provided as an even number thereof, and organized in relation to control by said control means into like numbers of even product clamping units and odd product clamping units;
   said control means being arranged to cause said respective pockets to have deposited therein in succession, products sequentially deposited at respective shifted release positions relative to one another, by respective said clamping heads of odd and even ones of said clamping units;
   said control means being arranged to determine said release positions based on speed of said second conveyor, speed of the transfer device, and shape and size of the products.

2. The equipment of claim 1, wherein:
   said movable supports are arranged for rotating respective ones of the clamping heads about respective axes, so as to rotate respective products from an initial orientation on said first conveyor, to a final orientation on said second conveyor.

3. The equipment of claim 2, wherein:
   said movable supports are arranged for moving the clamping head of each odd clamping unit through a first angular extent and for moving the clamping head of each even clamping unit through a second angular extent which is different from said first angular extent.

4. The equipment of claim 1, wherein:
   said control means are arranged to cause the products to be deposited one behind another in each said pocket, by each respective succeeding two of said clamping heads, respectively of an odd clamping unit and an even clamping unit.

5. The equipment of claim 1, wherein:
   said control means are arranged to cause the products to be deposited one beside another in each said pocket, by each respective succeeding two of said clamping heads, respectively of an odd clamping unit and an even clamping unit.

6. A method for forming groups of products to be fed to a processing machine, comprising:
   feeding the products in succession along a first path by a first conveyor, with an interval of first constant length between succeeding ones of the products;
   operating a second conveyor at a constant speed towards an inlet of the processing machine for feeding the processing machine with groups of the products; said second conveyor having a plurality of pockets arranged in succession along a second path, with an interval of a second constant length between succeeding ones of the pockets;

operating a transfer device having a plurality of clamping units which are uniformly arranged for movement along a third path; at least a section of said third path being disposed above a section of the first conveyor and a section of the second conveyor at which transfer of products from the first conveyor to the second conveyor is to occur, including moving said clamping units along said third path at a constant speed; said clamping units including movable supports supporting respective clamping heads for movement of the clamping heads relative to the respective clamping units throughout respective fourth paths;

controlling the transfer device by a controller operatively associated with the transfer device to operate in phased relation with said first and second conveyors, for removing the products in succession from said first conveyor and depositing them in succession in respective pockets of the second conveyor, a constant number of at least two of the products per pocket; said clamping units being provided as an even number thereof, and organized in relation to control by said controller into like numbers of even product clamping units and odd product clamping units;

said controller causing said respective pockets to have deposited therein in succession, products sequentially deposited at respective shifted release positions relative to one another, by respective said clamping heads of odd and even ones of said clamping units;

said controller determining said release positions based on speed of said second conveyor, speed of the transfer device, and shape and size of the products.

7. The method of claim 6, wherein:

said movable supports rotating respective ones of the clamping heads about respective axes, so as to rotate respective products from an initial orientation on said first conveyor, to a final orientation on said second conveyor.

8. The method of claim 7, wherein:

said movable supports moving the clamping head of each odd clamping unit through a first angular extent and moving the clamping head of each even clamping unit through a second angular extent which is different from said first angular extent.

9. The method of claim 6, wherein:

said controller causing the products to be deposited one behind another in each said pocket, by each respective succeeding two of said clamping heads, respectively of an odd clamping unit and an even clamping unit.

10. The method of claim 6, wherein:

said controller causing the products to be deposited one beside another in each said pocket, by each respective succeeding two of said clamping heads, respectively of an odd clamping unit and an even clamping unit.

* * * * *

UNITED STATES PATENT AND TRADEMARK OFFICE
CERTIFICATE OF CORRECTION

PATENT NO. : 5,871,079  
DATED : February 16, 1999  
INVENTOR(S) : Nannini et al.

Page 1 of 1

It is certified that error appears in the above-identified patent and that said Letters Patent is hereby corrected as shown below:

<u>Title page,</u>
Change:
[73] Assignee:"Azionaria Construzioni Macchine Automatiche A.C.M.A.S.P.A."
--Azionaria Costruzioni Macchine Automatiche A.C.M.A.S.p.A. --

Signed and Sealed this

Fourteenth Day of August, 2001

*Attest:*

NICHOLAS P. GODICI
*Attesting Officer*   *Acting Director of the United States Patent and Trademark Office*